(12) United States Patent
Kuo

(10) Patent No.: US 6,753,764 B2
(45) Date of Patent: Jun. 22, 2004

(54) BURGLARPROOF AND EVENT-RECORDING APPARATUS FOR VEHICLE AND METHOD FOR THE SAME

(75) Inventor: Jerry Kuo, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 16 days.

(21) Appl. No.: 10/134,378

(22) Filed: Apr. 30, 2002

(65) Prior Publication Data

US 2003/0201875 A1 Oct. 30, 2003

(51) Int. Cl.⁷ ............................................... B60R 25/10

(52) U.S. Cl. .............................. 340/426.2; 340/426.25; 701/300

(58) Field of Search ........................ 340/426.2, 426.25, 340/426.24, 428, 541; 307/10.5; 701/300

(56) References Cited

U.S. PATENT DOCUMENTS

| 4,922,224 A | * | 5/1990 | Drori et al. ................. 340/428 |
| 5,027,104 A | * | 6/1991 | Reid .......................... 340/541 |
| 5,515,285 A | * | 5/1996 | Garrett et al. .............. 701/300 |
| 5,708,307 A | * | 1/1998 | Iijima et al. ............... 307/10.5 |
| 5,805,055 A | * | 9/1998 | Colizza ................. 340/426.25 |

* cited by examiner

Primary Examiner—John Tweel
(74) Attorney, Agent, or Firm—Rosenberg, Klein & Lee

(57) ABSTRACT

A burglarproof and event-recording apparatus for a vehicle comprises at least one camera arranged on the vehicle to surveil an environmental image for the vehicle and store the image to an image-storing and logic-controlling unit until an alarm flag is set to 1 by the image-storing and logic-controlling unit. The apparatus will raise alarm and set the alarm flag to 1 once the vehicle is intruded. At this time, the image is stored in a currently-used memory block of the image-storing and logic-controlling unit and the intrusion condition is formed to the vehicle owner.

7 Claims, 4 Drawing Sheets

BURGLARPROOF AND EVENT-RECORDING APPARATUS FOR VEHICLE AND METHOD FOR THE SAME

FIELD OF THE INVENTION

The present invention relates to a burglarproof and event-recording apparatus for vehicle and method for the same, especially to a burglarproof and event-recording apparatus for vehicle, which can take a record for the vehicle once an intrusion or an attack occurs and inform authority concerned through mobile network, and method for the same.

BACKGROUND OF THE INVENTION

The conventional burglarproof device for vehicle generally comprises a collision sensor, which will raises an alarm in case that the vehicle is attacked or intruded. However, the conventional burglarproof device for vehicle lacks an event-recording apparatus for recording the attack or intrusion event and the vehicle owner has no idea about who the intruder is.

SUMMARY OF THE INVENTION

It is an object of the present invention to provide a burglarproof and event-recording apparatus, which can take a record for the vehicle once an intrusion or an attack occurs and inform authority concerned through mobile communication network.

It is another object of the present invention to provide a burglarproof and event-recording apparatus wherein the intrusion condition of the vehicle can be recorded with memory of less capacity.

It is still another object of the present invention to provide a burglarproof and event-recording apparatus wherein the vehicle owner can inquire the condition of his vehicle and view the image around his vehicle through mobile phones.

It is still another object of the present invention to provide a burglarproof and event-recording apparatus wherein the vehicle owner can inquire the condition of his vehicle once his vehicle is intruded or towed away.

To achieve above object, the present invention provides a burglarproof and event-recording apparatus for a vehicle comprises at least one camera arranged on the vehicle to surveil an environmental image for the vehicle and store the image to an image-storing and logic-controlling unit until an alarm flag is set to 1 by the image-storing and logic-controlling unit. The apparatus will raise alarm and set the alarm flag to 1 once the vehicle is intruded. At this time, the image is stored in a currently-used memory block of the image-storing and logic-controlling unit and the intrusion condition is formed to the vehicle owner.

The various objects and advantages of the present invention will be more readily understood from the following detailed description when read in conjunction with the appended drawing, in which:

DETAILED DESCRIPTION OF THE INVENTION

Figure 1:
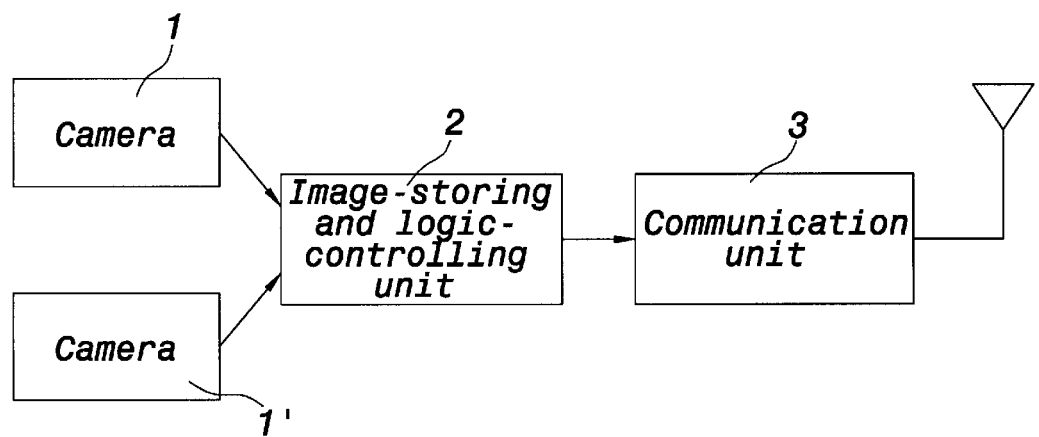
FIG. 1 shows a block diagram of the burglarproof and event-recording apparatus for vehicle according to the present invention.
Figure 2:
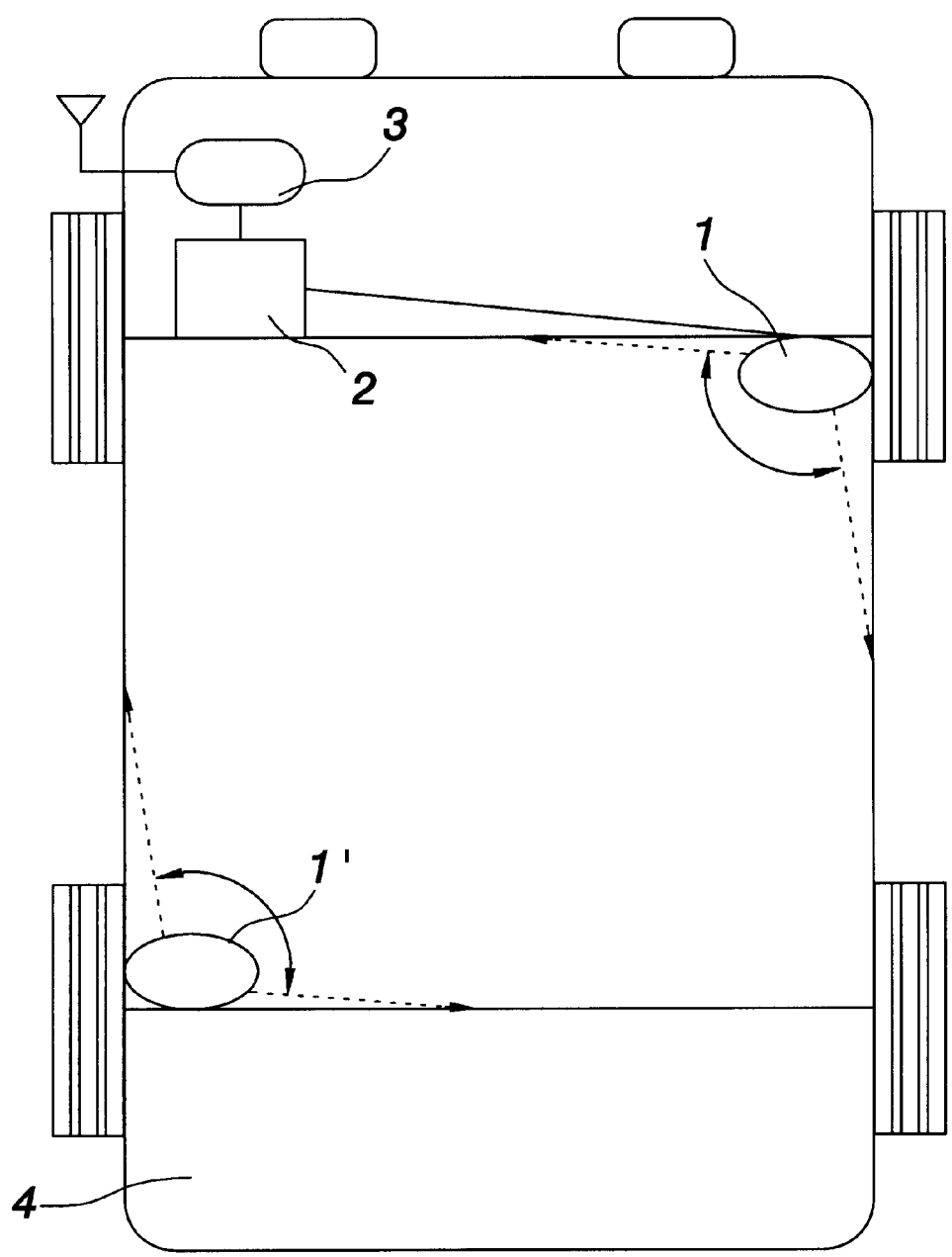
FIG. 2 shows a schematic diagram of the burglarproof and event-recording apparatus for vehicle according to the present invention.

FIG. 1 shows a block diagram of the burglarproof and event-recording apparatus for vehicle according to the present invention. The burglarproof and event-recording apparatus for a vehicle 4 comprises two cameras 1, 1', an image-storing and logic-controlling unit 2 and a communication unit 3. As shown in FIG. 2, the cameras 1, 1' are arranged at two opposite locations of the vehicle 4 to surveil the environmental condition of the vehicle 4.

The image-storing and logic-controlling unit 2 is used to store image shot by the cameras 1, 1' and execute controlling steps for the apparatus. For example, the image-storing and logic-controlling unit 2 can set alarm flag. The image-storing and logic-controlling unit 2 comprises two memory blocks to store image data alternatively.

When the vehicle 4 is attacked or intruded, the image-storing and logic-controlling unit 2 set an alarm flag to 1 and then communication unit 3 sends the image data and informs the vehicle owner through a wireless communication network. In a preferred embodiment of the present invention, the communication unit 3 is a GSM mobile phone.

Figure 3:
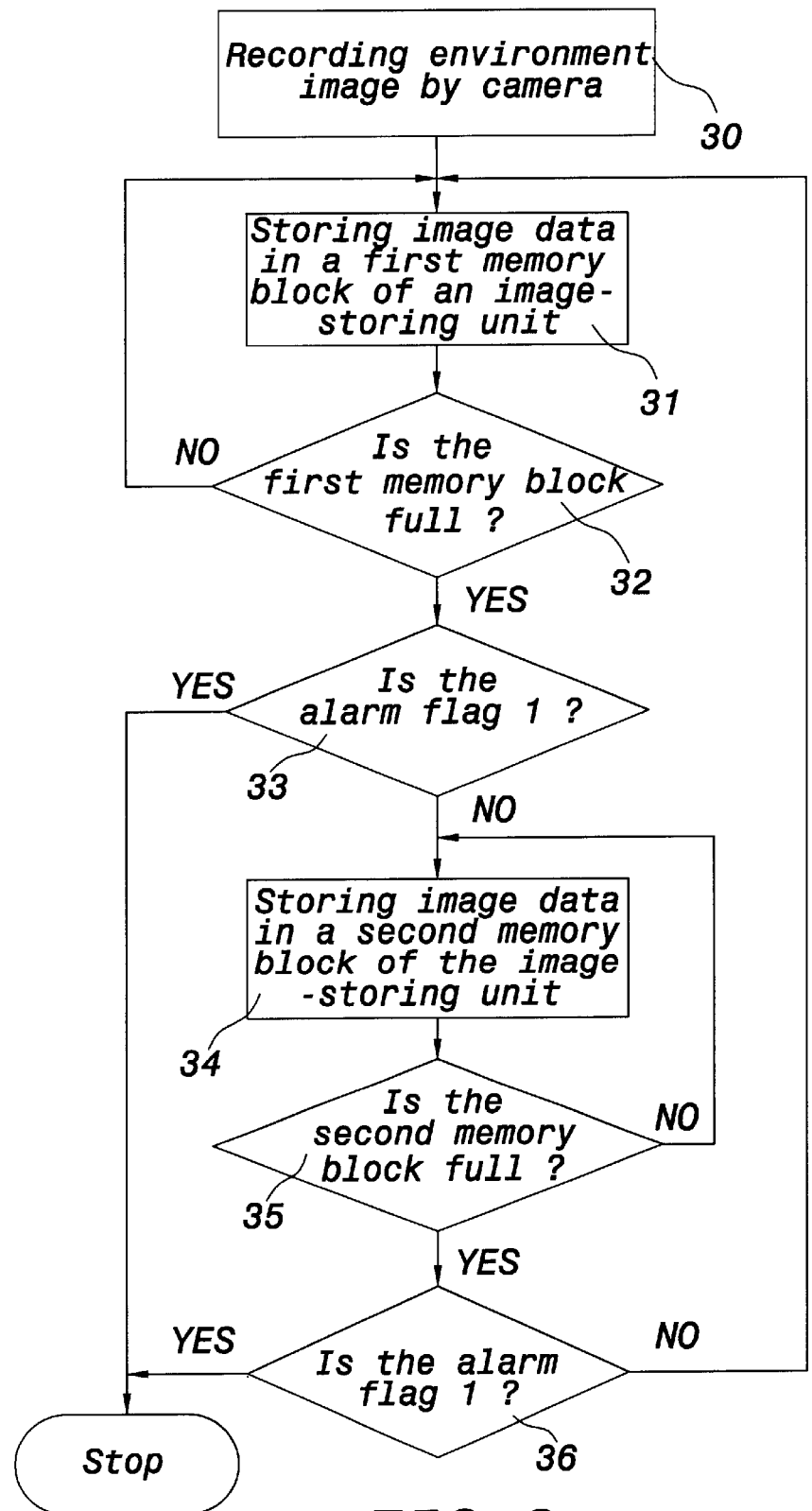
FIG. 3 shows a flowchart of the procedure for the burglarproof and event-recording method according to the present invention.
Figure 4:
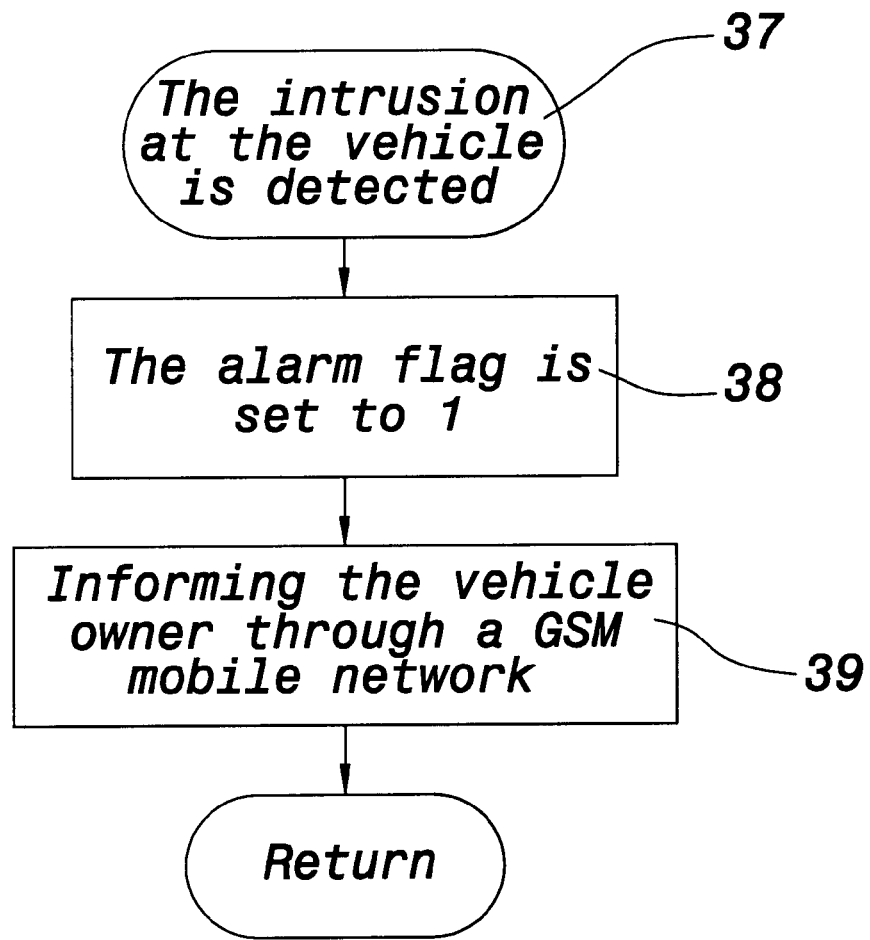
FIG. 4 shows a flowchart of the procedure for the burglarproof and event-recording method according to the present invention.

FIGS. 3 and 4 show the flowchart of the procedure for the burglarproof and event-recording method according to the present invention. At step 30, the environment image of the vehicle is recorded by camera. The image data is stored in a first memory block of an image-storing unit at step 31. The storage space of the first memory block is examined at step 32. If the storage space of the first memory block is not crowded, the procedure is back to step 31; else a logic controller judges whether an alarm flag is 1 at step 33.

If the alarm flag is 1, the procedure is stopped; else the image data is stored in a second memory block at step 34. Afterward, the storage space of the second memory block is examined at step 35. If the storage space of the second memory block is not crowded, the procedure is back to step 34; else the logic controller judges whether the alarm flag is 1 at step 33.

If the alarm flag is 1, the procedure is stopped; else procedure is back to step 31 for continuing storing data.

If the intrusion at the vehicle is detected at step 37, an alarm signal is raised and the alarm flag is automatically set to 1 at step 38. At this time, the image-storing unit will store the image data in the currently used memory block and will not store the image data in an alternative way. Afterward, a communication unit informs the vehicle owner through a GSM mobile network at step 39 and then the procedure is back to surveillance function.

Therefore, the vehicle owner can supervise the condition of his vehicle through the mobile communication system.

Moreover, the vehicle owner can also be informed through the mobile communication system once his vehicle is intruded or towed away.

To sum up, the burglarproof and event-recording apparatus for vehicle according to the present invention has following advantages:

1. The intrusion condition of the vehicle can be recorded with memory of less capacity.
2. The vehicle owner can be informed through the mobile communication system.
3. The vehicle owner can inquire the condition of his vehicle and view the image around his vehicle through mobile phones (GSM mobile phone, GPRS mobile phone or 3G mobile phone).

4. The vehicle owner can inquire the condition of his vehicle once his vehicle is intruded or towed away.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A vehicle security event-recording method comprising the steps of:
   (a) establishing at least first and second memory blocks in a vehicle;
   (b) automatically surveilling an area of the vehicle to continually acquire and pre-store images of said area selectively in at least one of said first and second memory blocks, said pre-storing of images being continued in the other of said first and second memory blocks when one is full;
   (c) setting an alarm indication upon an unauthorized intrusion of the vehicle; and
   (d) transmitting an informational signal to a user responsive to said alarm indication, at least a portion of said images pre-stored prior to said alarm indication being accessible to the user.

2. The vehicle security event-recording method as recited in claim 1, wherein said automatic surveilling is executed by video camera.

3. The vehicle security event-recording method as recited in claim 1, wherein said pre-storing of images continued in the other of said first and second memory blocks when one is full includes the step of overwriting earlier stored data in said other of said first and second memory blocks.

4. The vehicle security event-recording method as recited in claim 1, wherein said informational signal is transmitted by a mobile communication system in one of a GSM mobile communication format, a GPRS mobile communication system format, and a 3G mobile communication formats.

5. An event-recording security system for a vehicle comprising:
   (a) a memory unit having at least first and second memory blocks;
   (b) at least one camera unit;
   (c) a control unit coupled to said memory and camera units, said control unit being operable to automatically actuate said camera unit to continually acquire and pre-store images of an area of the vehicle selectively in at least one of said first and second memory blocks, said pre-storing of images being continued in the other of said first and second memory blocks when one is full, said control unit being operable to set an alarm indication upon an unauthorized intrusion of the vehicle; and
   (d) a communication unit coupled to said control unit for transmitting an informational signal to a user responsive to said alarm indication, at least a portion of said images pre-stored prior to said alarm indication being accessible to the user.

6. An event-recording security system as recited in claim 5, wherein said communication unit is a GSM mobile phone.

7. An event-recording security system as recited in claim 5, wherein said informational signal includes at least a portion of said pre-stored images.

* * * * *